United States Patent
Takada et al.

(10) Patent No.: US 9,440,300 B2
(45) Date of Patent: Sep. 13, 2016

(54) ELECTRIC DISCHARGE MACHINING APPARATUS

(71) Applicants: Tomoaki Takada, Chiyoda-ku (JP); Takashi Hashimoto, Chiyoda-ku (JP); Ieyoung Kim, Chiyoda-ku (JP); Takayuki Nakagawa, Chiyoda-ku (JP); Yuto Sasaki, Chiyoda-ku (JE); Yuji Nasu, Chiyoda-ku (JP); Masato Terashima, Chiyoda-ku (JP)

(72) Inventors: Tomoaki Takada, Chiyoda-ku (JP); Takashi Hashimoto, Chiyoda-ku (JP); Ieyoung Kim, Chiyoda-ku (JP); Takayuki Nakagawa, Chiyoda-ku (JP); Yuto Sasaki, Chiyoda-ku (JE); Yuji Nasu, Chiyoda-ku (JP); Masato Terashima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 542 days.

(21) Appl. No.: 13/982,933

(22) PCT Filed: Oct. 30, 2012

(86) PCT No.: PCT/JP2012/078069
§ 371 (c)(1),
(2) Date: Jul. 31, 2013

(87) PCT Pub. No.: WO2014/068682
PCT Pub. Date: May 8, 2014

(65) Prior Publication Data
US 2014/0116990 A1 May 1, 2014

(51) Int. Cl.
*B23H 1/02* (2006.01)
(52) U.S. Cl.
CPC ............. *B23H 1/022* (2013.01); *B23H 1/02* (2013.01); *B23H 2300/22* (2013.01)

(58) Field of Classification Search
CPC .... B23H 1/02; B23H 1/022; B23H 2300/22; B23H 2300/20
See application file for complete search history.

(56) References Cited

U.S. PATENT DOCUMENTS

| | | | | |
|---|---|---|---|---|
| 2,951,142 A | * | 8/1960 | Ullmann | B23H 1/022 219/69.13 |
| 3,777,108 A | * | 12/1973 | Maillet | B23H 1/022 219/69.13 |
| 4,277,668 A | * | 7/1981 | Inoue | B23H 1/02 219/69.13 |
| 4,571,561 A | | 2/1986 | Fujiki et al. | |
| 4,617,443 A | | 10/1986 | Martin | |
| 4,868,760 A | * | 9/1989 | Obara | B23H 7/065 219/69.12 |
| 5,585,014 A | * | 12/1996 | Magara | B23H 1/022 219/69.13 |
| 5,897,792 A | * | 4/1999 | Kaneko | B23H 1/022 219/69.18 |
| 6,069,335 A | * | 5/2000 | Kinbara | B23H 1/022 219/69.13 |

(Continued)

FOREIGN PATENT DOCUMENTS

| | | | |
|---|---|---|---|
| JP | 58-196923 A | 11/1983 | |
| JP | 59-42222 A | 3/1984 | |

(Continued)

*Primary Examiner* — Geoffrey S Evans
(74) *Attorney, Agent, or Firm* — Sughrue Mion, PLLC

(57) ABSTRACT

An electric discharge machining apparatus of the present invention includes a power supply, an electrode gap configured so as to be formed by an electrode and a workpiece, and an earth floating-capacitance current-suppressing coil configured to be inserted between the power supply and the electrode gap. Accordingly, the impedance in the charging path from the power supply to an interelectrode capacitance (an interelectrode parallel capacitor and an interelectrode parallel floating capacitance) can be decreased, and the impedance in the charging path to an earth floating capacitance can be increased, thereby enabling the electric current from the earth floating capacitance during discharge machining to be suppressed.

9 Claims, 6 Drawing Sheets

(56) References Cited

U.S. PATENT DOCUMENTS

| | | | |
|---|---|---|---|
| 6,130,395 A | 10/2000 | Kaneko et al. | |
| 6,222,149 B1* | 4/2001 | Toyonaga | B23H 1/022 219/69.13 |
| 7,645,958 B2* | 1/2010 | Oda | B23H 1/022 219/69.13 |
| 2003/0006721 A1* | 1/2003 | Kinbara | B23H 1/022 315/363 |
| 2008/0173617 A1* | 7/2008 | Murai | B23H 11/006 219/69.13 |

FOREIGN PATENT DOCUMENTS

| | | | |
|---|---|---|---|
| JP | 61-79521 A | | 4/1986 |
| JP | 1-210219 A | | 8/1989 |
| JP | 1-240223 A | | 9/1989 |
| JP | 2-30422 A | | 1/1990 |
| JP | 3-49824 A | * | 3/1991 |
| JP | 7-299658 A | | 11/1995 |
| JP | 11-123614 A | * | 5/1999 |
| JP | 2000-42835 A | | 2/2000 |
| JP | 2000-52151 A | | 2/2000 |
| JP | 2002-36030 A | | 2/2002 |

\* cited by examiner

ELECTRIC DISCHARGE MACHINING APPARATUS

CROSS REFERENCE TO RELATED APPLICATIONS

This application is a National Stage of International Application No. PCT/JP2012/078069, filed on Oct. 30, 2012, the contents of all of which are incorporated herein by reference in their entirety.

FIELD

The present invention relates to an electric discharge machining apparatus.

BACKGROUND

Electric discharge machining apparatuses perform machining by using the arc discharge generated in the electrode gap formed by an electrode and a workpiece to melt and remove material from the workpiece. With an electric discharge machining apparatus, surface roughness is refined by using finish machining conditions in which the machining current is sequentially decreased from a relatively large machining current that lasts for tens of microseconds and is used as rough machining condition to a pulse current that lasts for tens of nanoseconds and is used as fine machining condition.

Furthermore, for finish machining usage, consideration is given to use an RC circuit because the pulse width can be easily reduced. This circuit configuration includes an electrode gap formed by an electrode and a workpiece, a power supply that applies a voltage to the electrode gap, a current-limiting resistor that limits the electric current from the power supply, and an interelectrode parallel capacitor that accumulates discharge energy. Further, although it is not inserted into a circuit as an element, there is the floating capacitance of the capacitance components included in the mechanical structure and the cable. In the RC circuit configuration, when a power supply voltage is applied, an electric charge is accumulated in the interelectrode parallel capacitor and the floating capacitance in order to increase the interelectrode voltage. When the interelectrode voltage increases and an interelectrode distance decreases, interelectrode insulation is broken down, and the electric charge accumulated in the interelectrode parallel capacitor and the floating capacitance flows across the electrode gap. In the circuit configuration, the workpiece is melted and material is removed by the heat generated by the current.

Patent Literature 1 describes a technique whereby a magnetic circuit is connected in series with a tool electrode in an electric discharge machining apparatus. Consequently, according to Patent Literature 1, any discharge current due to the parasitic capacitance in a loop that includes a frame structure, a table, a machining piece, a machining zone, the tool electrode, an electrode holder, and a platform can be prevented from abruptly increasing, and thus the initial discharge current can be effectively attenuated.

Patent Literature 2 describes a wire-cut electric discharge machining apparatus in which a variable resistor is provided in wiring before a magnetic-switch contact, and an inductance element is provided in the wiring between the magnetic-switch contact and the workpiece. Consequently, according to Patent Literature 2, a circuit that supplies minute discharge energy to a machining gap is formed by the variable resistor and the inductance element, and the inductance element also has a role of negating the floating capacitance in the wiring.

Patent Literature 3 describes a high-frequency electric discharge machining apparatus in which an impedance matching circuit is provided between a high-frequency power generator and the start point of a coaxial cable and an impedance matching circuit is provided between the terminal of the coaxial cable and a discharge electrode. Consequently, according to Patent Literature 3, the output impedance of the high-frequency power generator is converted to the characteristic impedance of the coaxial cable so as to introduce the output power of the high-frequency power generator into the coaxial cable efficiently, and the output impedance of the impedance matching circuit can be regarded on the discharge load side as being a pure resistance, thereby enabling the electrostatic capacitance of the discharge portion to be reduced.

CITATION LIST

Patent Literatures

Patent Literature 1: Japanese Patent Application Laid-open No. 59-042222
Patent Literature 2: Japanese Patent Application Laid-open No. 2000-052151
Patent Literature 3: Japanese Patent Application Laid-open No. 1-240223

SUMMARY

Technical Problem

The present inventor has conducted detailed studies on the floating capacitance of electric discharge machining apparatuses. In electric discharge machining apparatuses, it can be assumed that the floating capacitance present in the mechanical structure and the cable is broadly divided into two categories depending on the generation position thereof: the first floating capacitance is an interelectrode parallel floating capacitance, and the second floating capacitance is an earth floating capacitance. To refine the surface roughness, in the RC circuit which has no interelectrode parallel capacitor, two kinds of current, i.e., a current from the interelectrode parallel floating capacitance and a current from the earth floating capacitance, become dominant. Further, to refine the surface roughness, reduction of these two currents is required.

In Patent Literatures 1 to 3, there is only a description of interelectrode parallel floating capacitance, and there is no description of the earth floating capacitance. Therefore, in Patent Literatures 1 to 3, there is no description of how to suppress the current due to the earth floating capacitance.

The present invention has been achieved to solve the above problems, and an objective of the present invention is to provide an electric discharge machining apparatus that can suppress the current due to earth floating capacitance.

Solution to Problem

To solve the above-mentioned problems, and to achieve the objective, an electric discharge machining apparatus according to one aspect of the present invention includes a power supply, an electrode gap formed by an electrode and a workpiece, and an earth floating-capacitance current-suppressing coil inserted between the power supply and the electrode gap.

Advantageous Effects of Invention

According to the present invention, an earth floating-capacitance current-suppressing coil is inserted between a power supply and an electrode gap. Accordingly, the impedance in the charging path from the power supply to an interelectrode capacitance (an interelectrode parallel capacitor and an interelectrode parallel floating capacitance) can be decreased, and the impedance in the charging path to an earth floating capacitance can be increased. Consequently, the influence of the earth floating capacitance can be selectively suppressed, and the current from the earth floating capacitance can be suppressed during the performing of discharge machining.

DESCRIPTION OF EMBODIMENTS

Exemplary embodiments of an electric discharge machining apparatus according to the present invention are explained below in detail with reference to the accompanying drawings. The present invention is not limited to these embodiments.

First Embodiment

Figure 1:
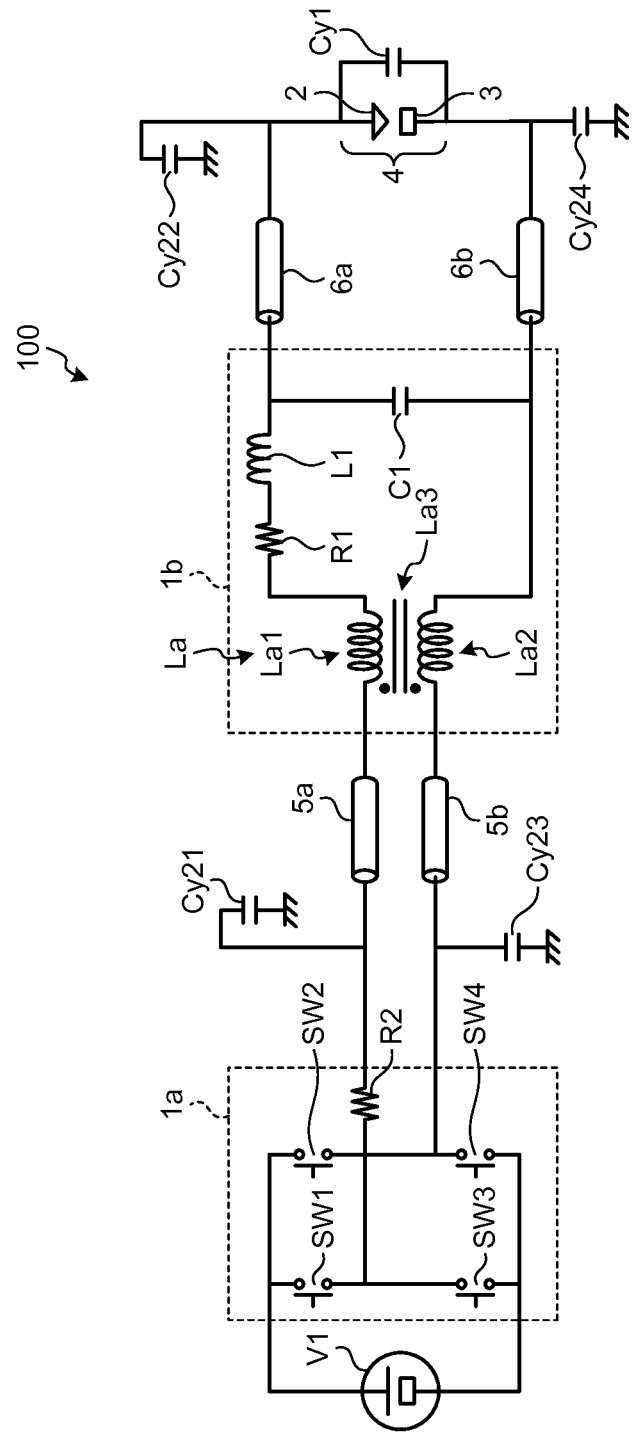
FIG. 1 is a circuit diagram of a configuration of an electric discharge machining apparatus according to a first embodiment.

An electric discharge machining apparatus 100 according to a first embodiment is explained with reference to FIG. 1. FIG. 1 is a circuit diagram of a configuration of the electric discharge machining apparatus 100.

The electric discharge machining apparatus 100 includes a power supply V1, a switching circuit 1a, an earth floating-capacitance current-suppressing circuit 1b, an electrode gap 4, cables 5a and 5b, and cables 6a and 6b.

The power supply V1 is, for example, a DC power supply and generates DC power. The power supply V1 is connected to the electrode gap 4 via the switching circuit 1a. For example, the power supply V1 is a power supply device that applies a machining voltage matched with the finish machining conditions to the electrode gap 4 in order to generate the discharge required for finish machining at the electrode gap 4.

The power supply V1 can be an AC power supply. When the power supply V1 is an AC power supply, a rectifier circuit can be provided between the power supply V1 and the switching circuit 1a.

The switching circuit 1a connects electrically the power supply V1 and the electrode gap 4, and for example, connects electrically the power supply V1 and the cables 5a and 5b. The switching circuit 1a turns on/off voltage application from the power supply V1 to the electrode gap 4 and switches over the polarity of the voltage applied from the power supply V1 across the electrode gap 4.

The earth floating-capacitance current-suppressing circuit 1b suppresses the current from earth floating capacitances Cy21 to Cy24. The details of the earth floating-capacitance current-suppressing circuit 1b are explained later.

The electrode gap 4 is formed by an electrode 2 and a workpiece 3. Specifically, the electrode 2 and the workpiece 3 face each other across a machining gap.

The cables 5a and 5b connect the switching circuit 1a and the earth floating-capacitance current-suppressing circuit 1b to each other. The cables 5a and 5b are, for example, coaxial cables, and they include a power cable that connects the switching circuit 1a and the earth floating-capacitance current-suppressing circuit 1b, and an earth cable. The power cable and the earth cable are coaxially located within an insulated coating.

The cables 6a and 6b connect the earth floating-capacitance current-suppressing circuit 1b and the electrode gap 4 to each other. The cables 6a and 6b are, for example, coaxial cables, and they include a power cable that connects the earth floating-capacitance current-suppressing circuit 1b and the electrode gap 4, and they include an earth cable coaxially on the inside of an insulation coating.

In the electric discharge machining apparatus 100, there are floating capacitance components in the electric discharge machining apparatus body (not shown) and/or the cables 5a, 5b, 6a, and 6b. There are broadly two categories of floating capacitance: Cy1 shown in FIG. 1 indicates an interelectrode parallel floating capacitance being present in parallel with the electrode gap 4; and Cy21 to Cy24 indicate earth floating capacitances being present with respect to the earth.

In FIG. 1, a case in which the cables 5a, 5b, 6a, and 6b are used is shown. However, the cables do not always need to be used, and specifically, it is desirable to shorten the cable between the earth floating-capacitance current-suppressing circuit 1b and the electrode gap 4 so that it is as short as possible to reduce the interelectrode parallel floating capacitance of the cable.

The earth floating-capacitance current-suppressing circuit 1b includes an earth floating-capacitance current-suppressing coil La, a current limiting resistor R1, a time-constant adjusting coil L1, and an interelectrode parallel capacitor C1.

Specifically, in the earth floating-capacitance current-suppressing circuit 1b, the earth floating-capacitance current-suppressing coil La is inserted between the power supply V1 and the electrode gap 4, and for example, is inserted between "the current limiting resistor R1, the time-constant adjusting coil L1, and the interelectrode parallel capacitor C1" and "the cables 5a and 5b" (see FIG. 1). The current limiting resistor R1 is connected in series between the power supply V1 and the electrode gap 4 and, for example, connected in series between the earth floating-capacitance current-suppressing coil La and the electrode gap 4. The time-constant adjusting coil L1 is connected in series between the power supply V1 and the electrode gap 4 and, for example, is connected in series between the earth floating-capacitance current-suppressing coil La and the electrode gap 4. The interelectrode parallel capacitor C1 is connected in parallel with the electrode gap 4 with respect to the power supply V1.

More specifically, the earth floating-capacitance current-suppressing coil La includes, for example, a core La3 (see FIG. 2), a first winding La1, and a second winding La2. The core La3 is made of ferrite, for example.

The first winding La1 is connected between the power supply V1 and the electrode 2 and, for example, is connected in series with a line that connects the power supply V1 and the electrode 2. The first winding La1 is connected in series, for example, between "the current limiting resistor R1, the time-constant adjusting coil L1, and the interelectrode parallel capacitor C1" and "the cable 5a" (see FIG. 1). The first winding La1 is wound around the core La3 in the opposite direction to that of the second winding La2.

The second winding La2 is connected between the power supply V1 and the workpiece 3 and, for example, is connected in series with a line that connects the power supply V1 and the workpiece 3. The second winding La2 is connected in series, for example, between the cable 6b and the cable 5b. The second winding La2 is wound around the core La3 in the opposite direction to that of the first winding La1.

The earth floating-capacitance current-suppressing circuit 1b is arranged near the electrode gap 4 (the electric discharge machining apparatus body) in order to reduce the interelectrode parallel floating capacitance Cy1. However, this configuration indicates an example of the best mode in which the influence of the interelectrode parallel floating capacitance Cy1 in a subsequent stage of the earth floating-capacitance current-suppressing circuit 1b is reduced. In order to suppress the current from the interelectrode parallel floating capacitance Cy1, in the best mode, all the components of the earth floating-capacitance current-suppressing circuit 1b are arranged near the electrode gap 4. However, the suppression effect can still be acquired so long as at least one of the components is inserted near the electrode gap 4. However, to suppress the current from the earth floating capacitances Cy21 to Cy24, the earth floating-capacitance current-suppressing coil La needs to be inserted between the power supply V1 and the electrode gap 4, while insertion positions of the current limiting resistor R1 and the time-constant adjusting coil L1 are arbitrary.

The switching circuit is includes switching elements SW1 to SW4, and a current limiting resistor R2. For example, in the switching circuit 1a, the switching elements SW1 to SW4 are formed from a full-bridge type switching element, and control signals to the switching elements SW1 to SW4 are supplied from a control circuit (not shown). The role of the switching elements SW1 to SW4 is to switch over the polarity of the voltage applied to the electrode 2 and the workpiece 3 and to control the pulse of the applied voltage.

For example, in discharge machining in which reverse polarity machining is performed by turning on the switching elements SW1 and SW4 and turning off the switching elements SW2 and SW3, surface roughness is fine but the speed is slow. On the other hand, in discharge machining in which straight polarity machining is performed by turning off the switching elements SW1 and SW4 and turning on the switching elements SW2 and SW3, surface roughness is rough but the speed is fast. That is, the machining characteristics can be selected by switching over the polarity. Pulse control has an effect such that machining is stabilized by inputting an appropriate control signal during discharge completion, when there is a short circuit, and when an arc current becomes sustained. However, the pulse control and the full-bridge circuit are not always required, and a half-bridge circuit or a single switch circuit can be used, and a semiconductor switch or a mechanical relay can be used for the switching element.

The current limiting resistor R2 in the switching circuit 1a is provided, for example, on the output side of the switching elements SW1 to SW4 in the switching circuit 1a in order to prevent current surge when the element or the cable has a defect at an output destination of the switching circuit 1a that causes a short circuit. This is effective when the switching circuit 1a and the earth floating-capacitance current-suppressing circuit 1b are arranged away from each other with a physical distance therebetween such that these circuits are connected by a cable. When the earth floating-capacitance current-suppressing circuit 1b is configured to be included in the switching circuit 1a, the current limit resistor R2 is not always required.

The current limiting resistor R1 in the earth floating-capacitance current-suppressing circuit 1b limits the current from the power supply V1 to prevent the arc current from becoming sustained during discharge and when there is a short circuit. Furthermore, the current limiting resistor R1 can limit the current from the interelectrode parallel floating capacitance Cy1, which is provided in a subsequent stage of the current limiting resistor R1, during discharge, thereby enabling the surface roughness to be refined.

The current limiting resistor R1 is preferably from 500 ohms to 2 kilo-ohms, inclusive. If the current limiting resistor R1 becomes larger than 2 kilo-ohms, the charging speed of the interelectrode parallel capacitor C1 or the interelectrode parallel floating capacitance Cy1 is interrupted by the current limiting resistor R1 and there is a decrease in the discharge repetition, i.e., discharge frequency, and thus the machining speed may decrease. Alternatively, if the current limiting resistor R1 becomes smaller than 500 ohms, it becomes difficult to limit the current from the power supply V1 during discharge and when there is a short circuit.

When the current limiting resistor R1 is from 500 ohms to 2 kilo-ohms, inclusive, it is desirable that the current limiting resistor R2 is from 8 ohms to 100 ohms, inclusive. If the current limiting resistor R2 becomes larger than 100 ohms, the charging speed of the interelectrode parallel capacitor C1 or the interelectrode parallel floating capacitance Cy1 is interrupted by the current limiting resistor R2 and there is a decrease in the discharge repetition or discharge frequency, and thus the machining speed may decrease. Alternatively, if the current limiting resistor R2 becomes smaller than 8 ohms, the element or the cable will have a defect at the output destination of the switching circuit 1a that causes a short circuit, and thus it is difficult to prevent current surge.

When the current limiting resistor R1 is from 500 ohms to 2 kilo-ohms, inclusive, it is desirable that the interelectrode parallel capacitor C1 is from 100 picofarads to 2 nanofarads, inclusive. If the interelectrode parallel capacitor C1 becomes larger than 2 nanofarads, the charging speed becomes slow and there is a decrease in discharge repetition, i.e., discharge frequency, and thus the machining speed may decrease. Alternatively, if the interelectrode parallel capacitor C1 is smaller than 100 picofarads, it becomes difficult to accumulate sufficient discharge energy in a short time.

The time-constant adjusting coil L1 in the earth floating-capacitance current-suppressing circuit 1b is for adjusting the charge time constant of the interelectrode parallel capacitor C1 and the interelectrode parallel floating capacitance Cy1 in order to set the charging speed to be equal to or larger than that of the RC circuit. By improving the charging speed, the discharge frequency increases and the machining speed can be improved. By the action of the coil, an RLC circuit can be created, and the interelectrode parallel floating capacitance Cy1 can be charged at a time constant equal to or larger than the charge time constant of the RC circuit, with the following equation (1) being satisfied (a marginal condition).

$$R=2\sqrt{(L/C)} \qquad (1)$$

The time-constant adjusting coil L1 needs to select an appropriate value with respect to the values of the current limiting resistor R1, the interelectrode parallel capacitor C1, and the interelectrode parallel floating capacitance Cy1. However, the time-constant adjusting coil L1 is not directly involved with suppressing the current from the earth floating capacitances Cy21 to Cy24, and the time-constant adjusting coil L1 is provided for adjusting the time constant. When adjustment of the time constant is not required, the time-constant adjusting coil L1 can be omitted.

The interelectrode parallel capacitor C1 in the earth floating-capacitance current-suppressing circuit 1b can select the relation between the surface roughness and the machining speed by selecting the capacity thereof. When the capacity is increased, the machining speed is increased and the surface roughness becomes rough. In contrast, when the capacity is decreased, the machining speed is decreased and the surface roughness is refined. However, the interelectrode parallel capacitor C1 is not always required, and to obtain finer surface roughness, the interelectrode parallel capacitor C1 can be detached and only the interelectrode parallel floating capacitance Cy1 is used.

Figure 2:
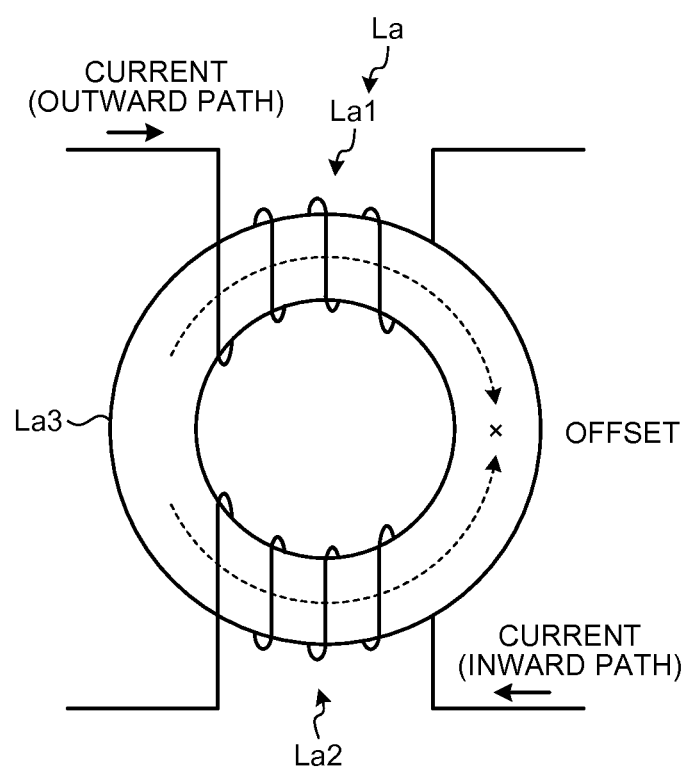
FIG. 2 is a configuration example of an earth floating-capacitance current-suppressing coil in the first embodiment.

The principle of the earth floating-capacitance current-suppressing coil La in the earth floating-capacitance current-suppressing circuit 1b is explained next. FIG. 2 depicts a configuration of the earth floating-capacitance current-suppressing coil La.

The earth floating-capacitance current-suppressing coil La is formed by winding the first winding La1 and the second winding La2, respectively, so that magnetic fluxes generated in the core La3 cancel each other out when the current in an outward path (the first winding La1) and the current in an inward path (the second winding La2) flow in opposite directions, i.e., when the first winding La1 and the second winding La2 are wound in opposite directions to each other with respect to the core La3. If magnetic flux leakage occurs in the windings, sufficient negating effect cannot be obtained and an uncanceled reactor component remains in the path. To prevent this, it is desirable to equalize the number of windings, the winding interval, and the like in the outward path (the first winding La1) and the inward path (the second winding La2).

Next, the principle of operations according to the first embodiment is explained with reference to FIG. 1. The reverse polarity machining in which the switching elements SW1 and SW4 are turned on and the switching elements SW2 and SW3 are turned off (machining in which the surface roughness is fine but the speed is slow) is explained here as an example.

When the switching elements SW1 and SW4 are turned on, the interelectrode parallel capacitor C1 and the interelectrode parallel floating capacitance Cy1 are charged by the power supply V1 using a path from the power supply V1 through the switching element SW1, the current limiting resistor R2, the earth floating-capacitance current-suppressing coil La (the first winding La1), the current limiting resistor R1, the time-constant adjusting coil L1, the electrode 2, the workpiece 3, the earth floating-capacitance current-suppressing coil La (the second winding La2), the switching element SW4, and the power supply V1. At this time, the current of the path formed from the outward path and the inward path flows in the earth floating-capacitance current-suppressing coil La, and the path becomes a low-impedance path due to the magnetic-flux negating effect in the earth floating-capacitance current-suppressing coil La.

Next, regarding the charge to the earth floating capacitance, it is explained, for example, on a path formed by the earth floating capacitance Cy21 and the earth floating capacitance Cy24 is explained next. When a voltage is applied, the current tries to flow in the following orders: from the power supply V1, to the switching element SW1, the current limiting resistor R2, the earth floating capacitance Cy21, and then to the earth; and from the earth to the earth floating capacitance Cy24, the earth floating-capacitance current-suppressing coil La (the second winding La2), and then to the switching element SW4. However, currents in the opposite direction to each other are not present in the earth floating-capacitance current-suppressing coil La, and thus a magnetic-flux negating effect cannot be obtained. Therefore, the magnetic flux functions as a large impedance with respect to this path, i.e., the electric charge is hardly accumulated in the earth floating capacitance Cy21 and the earth floating capacitance Cy24. As a result, when the electrode gap 4 performs discharge, the surface roughness due to discharge machining can be easily refined because the current from the earth floating capacitance Cy21 and the earth floating capacitance Cy24 can be suppressed.

If the current limiting resistor R1 is provided on the inward path side instead of the outward path side, it can be assumed that the charge current to the earth floating capacitance Cy21 and the earth floating capacitance Cy24 can be suppressed. However, earth floating capacitance may be present in various places, and, for example, it is difficult to suppress the current in the path formed by the earth floating capacitance Cy22 and the earth floating capacitance Cy24. Furthermore, when the current limiting resistor R1 is provided on the inward path side instead of the outward path side, it may become difficult to limit the current from the power supply V1 during discharge and when there is a short circuit.

If the current limiting resistor R1 is inserted into both the outward path and the inward path, current suppression in separate paths can be expected. However, because the charging path from the power supply V1 to the electrode 2 and the workpiece 3, which is the original charging path to the electrode gap 4, also functions as a high impedance element, the discharge frequency decreases, and thus the machining speed may decrease.

Alternatively, if the time-constant adjusting coil L1 is inserted into the outward and inward paths, with the value thereof being sufficiently increased, current suppression in separate paths can be expected. However, also in this case, because the charging path itself to the electrode gap provides a high impedance, sufficient machining speed may not be obtained. Furthermore, in the charging path to the interelectrode parallel capacitor C1 and the interelectrode parallel floating capacitance Cy1, because the time constant of the RLC circuit is different from the optimum value, the charging speed may decrease and thus voltage waveform disturbance may occur due to overshoot.

As described above, according to the first embodiment, in the electric discharge machining apparatus 100, the earth floating-capacitance current-suppressing coil La is inserted between the power supply V1 and the electrode gap 4. Accordingly, the impedance in the charging path from the power supply V1 to the capacitance of the electrode gap 4 (the interelectrode parallel capacitor C1 and the interelectrode parallel floating capacitance Cy1) can be decreased, and the impedance in the charging path to the earth floating capacitance Cy21 and the earth floating capacitance Cy24 can be increased, thereby enabling the selective suppression of the influence of the earth floating capacitance, and thus the current from the earth floating capacitance can be suppressed during discharge machining. Therefore, charge from the power supply V1 to the electrode gap 4 can be performed at high speed, the discharge frequency can be increased, and the discharge current flowing to the electrode gap 4 during discharge machining can be limited to a small current, thereby enabling the realization of both an improvement in the machining speed and to the surface roughness.

According to the first embodiment, the switching circuit 1a switches over the polarity of the voltage applied from the power supply V1 to the electrode gap 4. Accordingly, the straight polarity machining in which the surface roughness is rough and the speed is fast and the reverse polarity machining in which the surface roughness is fine and the speed is slow can be switched over, thereby enabling the selection of the machining characteristics and the stabilizing of the machining by pulse control.

According to the first embodiment, the current limiting resistor R1 is connected in series between the power supply V1 and the electrode gap 4. Accordingly, the current flowing from the power supply V1 into the electrode gap 4 can be limited and the arc current can be prevented from becoming sustained during discharge and when there is a short circuit. Furthermore, the current from the interelectrode parallel floating capacitance Cy1 in a subsequent stage of the current limiting resistor R1 can be limited during discharge, thereby enabling the surface roughness to be refined.

According to the first embodiment, the time-constant adjusting coil L1 is connected in series between the power supply V1 and the electrode gap 4. Accordingly, because the RLC circuit is formed by the time-constant adjusting coil L1 together with the current limiting resistor R1 and the capacitance of the electrode gap 4 (the interelectrode parallel capacitor C1 and the interelectrode parallel floating capacitance Cy1), a voltage rising speed faster than that of the RC circuit can be realized. Accordingly, because the discharge frequency can be increased, the machining speed can be improved.

According to the first embodiment, at least one of the current limiting resistor R1, the time-constant adjusting coil L1, and the earth floating-capacitance current-suppressing coil La is arranged near the electrode gap 4. Accordingly, suppression can be achieved of the electric charge accumulated in the interelectrode parallel floating capacitance Cy1 flowing to the electrode gap 4 during discharge, and the discharge current flowing to the electrode gap 4 during discharge machining can be limited to a small current, thereby enabling the surface roughness to be refined.

According to the first embodiment, in the earth floating-capacitance current-suppressing coil La, the first winding La1 is connected between the power supply V1 and the electrode 2, and the second winding La2 is connected between the power supply V1 and the workpiece 3. The first winding La1 and the second winding La2 are wound around the core La1 in opposite directions to each other. Accordingly, the magnetic flux due to the current of the first winding La1 and the magnetic flux due to the current of the second winding La2 negate each other when charge flows from the power supply V1 to the capacitance of the electrode gap 4 (the interelectrode parallel capacitor C1 and the interelectrode parallel floating capacitance Cy1), and thus the magnetic flux does not provide substantial inductance. When charge flows to the earth floating capacitances Cy21 to Cy24, the current flows to one of the first winding La1 and the second winding La2 and there is no magnetic-flux negating effect. Accordingly, the magnetic flux provides inductance. As a result, the impedance in the charging path from the power supply V1 to the capacitance of the electrode gap 4 (the interelectrode parallel capacitor C1 and the interelectrode parallel floating capacitance Cy1) can be decreased, and the impedance in the charging path to the earth floating capacitances Cy21 to Cy24 can be increased.

Second Embodiment

Figure 3:
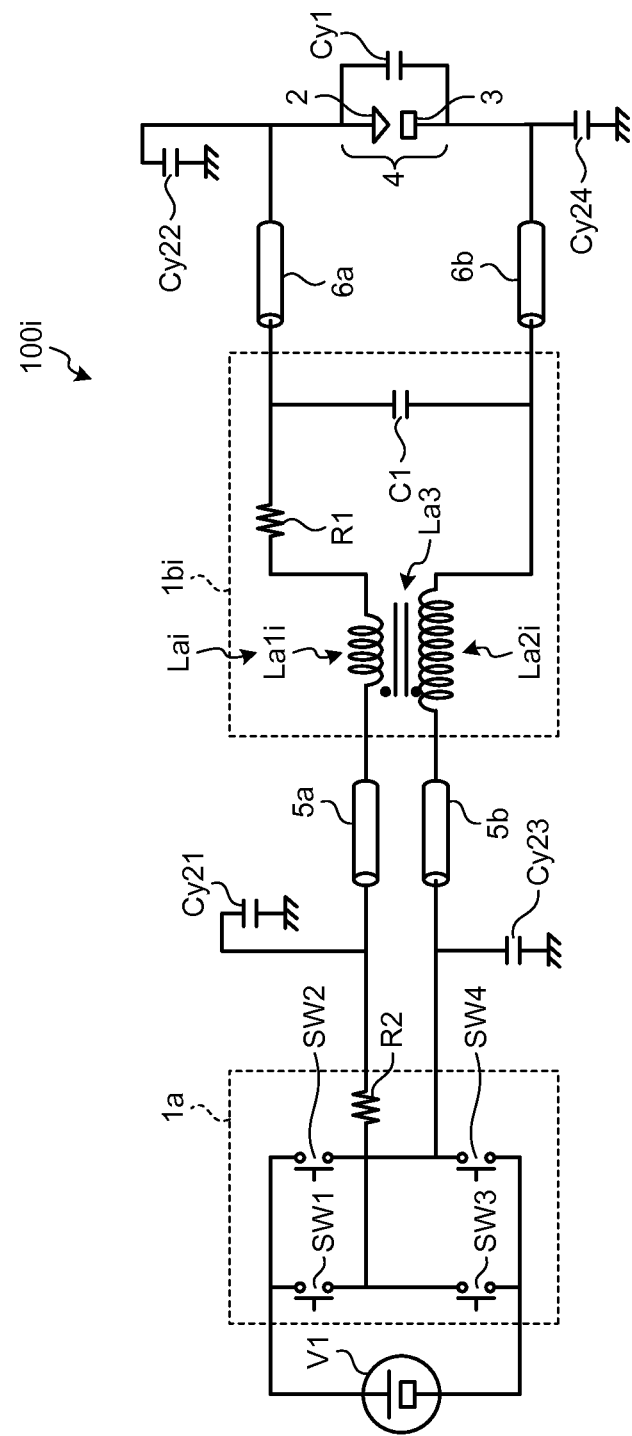
FIG. 3 is a circuit diagram of a configuration of an electric discharge machining apparatus according to a second embodiment.
Figure 4:
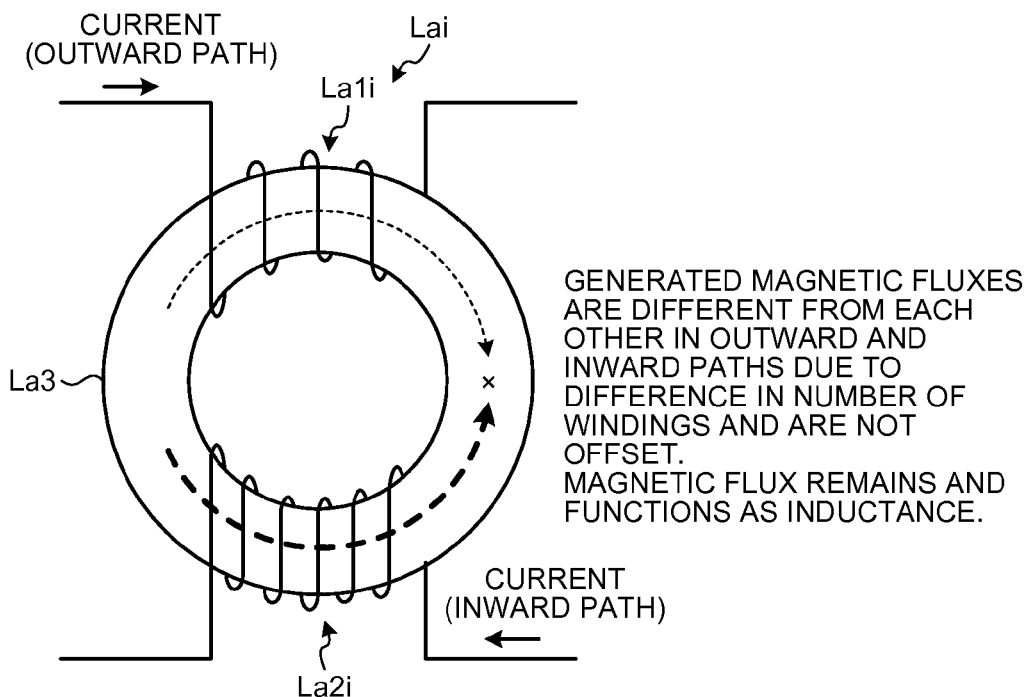
FIG. 4 is a configuration example of an earth floating-capacitance current-suppressing coil used in the second embodiment.
Figure 5:
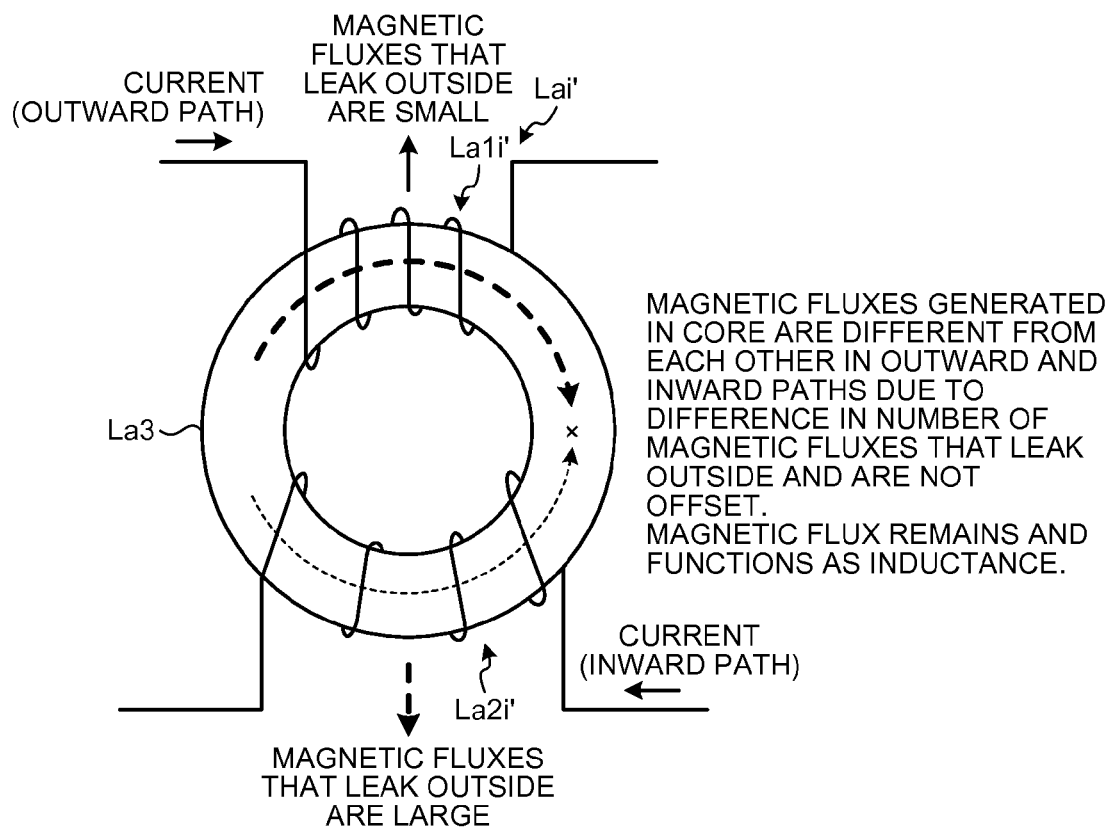
FIG. 5 is another configuration example of an earth floating-capacitance current-suppressing coil used in the second embodiment.

Next, an electric discharge machining apparatus 100i according to a second embodiment is explained with reference to FIGS. 3 to 5. FIG. 3 is a circuit diagram of a configuration of the electric discharge machining apparatus 100i. FIG. 4 is a configuration example of an earth floating-capacitance current-suppressing coil La1. FIG. 5 is another configuration example of an earth floating-capacitance current-suppressing coil La1'. The explanation below is mainly of the features that are different from the first embodiment.

According to the first embodiment, the time-constant adjusting coil L1 adjusts the charge time constant of the interelectrode parallel capacitor C1 and the interelectrode parallel floating capacitance Cy1 in order to increase the discharge frequency and thus to improve the machining speed. However, the number of parts increases due to an addition of the coil, and the volume of the circuit may increase.

Therefore, according to the second embodiment, the earth floating-capacitance current-suppressing coil La1 has the function of the time-constant adjusting coil L1 in addition to the same function as that of the earth floating-capacitance current-suppressing coil La according to the first embodiment (the function of suppressing the current of the earth floating capacitance).

Specifically, the electric discharge machining apparatus 100i includes an earth floating-capacitance current-suppressing circuit 1bi instead of the earth floating-capacitance current-suppressing circuit 1b. The earth floating-capacitance current-suppressing circuit 1bi does not have the time-constant adjusting coil L1 (see FIG. 1), but it has an earth floating-capacitance current-suppressing coil La1 instead of the earth floating-capacitance current-suppressing coil La.

The earth floating-capacitance current-suppressing coil La1 includes a first winding La1i and a second winding La2i instead of the first winding La1 and the second winding La1, respectively. The first winding La1i and the second winding La2i have at least one of a different number of windings and a different winding interval.

For example, in the earth floating-capacitance current-suppressing coil La1 shown in FIG. 4, the first winding La1i and the second winding La2i have a different number of windings. Accordingly, the magnetic flux due to the current of the first winding La1i and the magnetic flux due to the current of the second winding La2i are unbalanced. Therefore, magnetic fluxes that originally negated each other do not negate each other, and the magnetic flux generated in the winding having a larger number of windings remains. Consequently, even if the currents flow in opposite directions to each other, the earth floating-capacitance current-suppressing coil La1 functions as a normal coil with respect to the currents, and thereby, with this configuration, realizing the same function as that of the time-constant adjusting coil L1 is enabled.

Alternatively, for example, in the earth floating-capacitance current-suppressing coil La1' shown in FIG. 5, the first winding La1$i$' and the second winding La2$i$' have a different winding interval from each other. Accordingly, a magnetic flux due to the current of the first winding La1$i$' and a magnetic flux due to the current of the second winding La2$i$' are unbalanced. Therefore, magnetic fluxes that originally negated each other do not negate each other, and the magnetic flux generated in the winding having a larger number of windings remains. Consequently, even if the currents flow in opposite directions to each other, the earth floating-capacitance current-suppressing coil La1' functions as a normal coil with respect to the currents, and thereby, with this configuration, realizing the same function as that of the time-constant adjusting coil L1 is enabled.

As described above, according to the second embodiment, in the electric discharge machining apparatus 100$i$, the first winding La1$i$ and the second winding La2$i$ of the earth floating-capacitance current-suppressing coil La1 have a least one of a different number of windings and a different winding interval. Accordingly, the magnetic fluxes are unbalanced, and magnetic fluxes that originally negated each other do not negate each other, and the magnetic flux generated in the winding having a larger number of windings remains. Consequently, even if the currents flow in opposite directions to each other to the first winding La1$i$ and the second winding La2$i$, the earth floating-capacitance current-suppressing coil La1 functions as a normal coil with respect to the currents, and thereby, with this configuration, realization of the same function as that of the time-constant adjusting coil is enabled. As a result, because the time-constant adjusting coil L1 (see FIG. 1) does not need to be attached, space saving and cost reduction can be realized.

Third Embodiment

Figure 6:
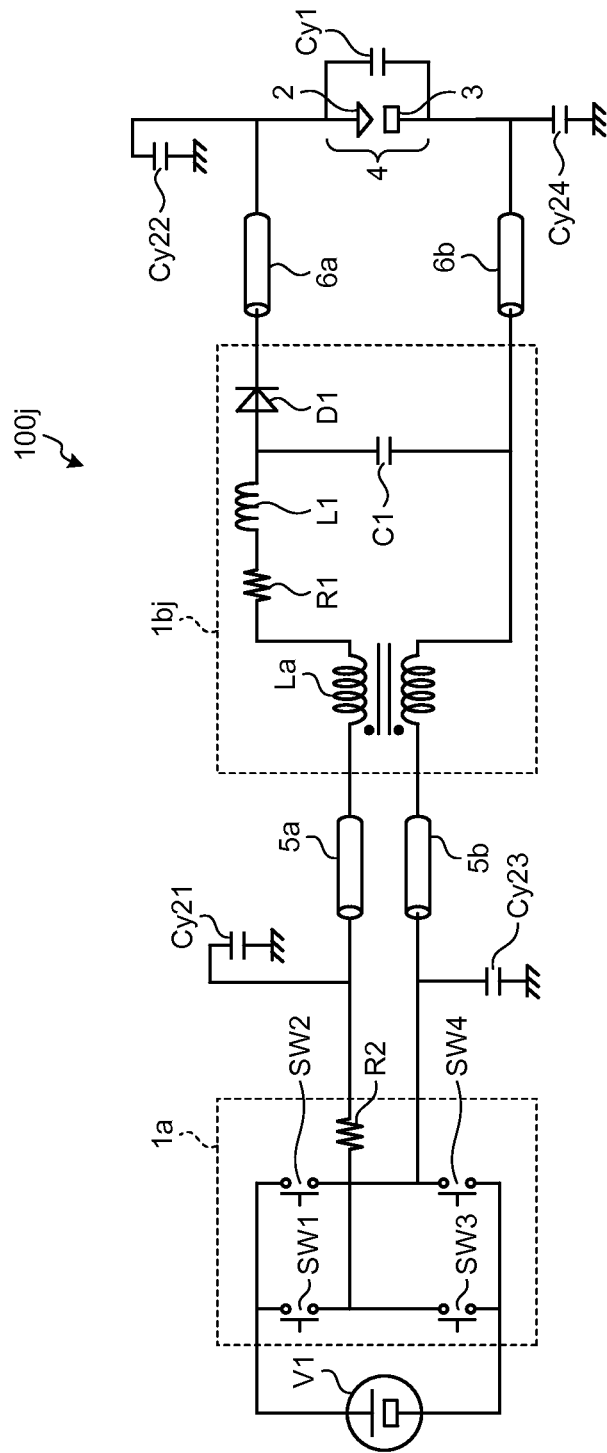
FIG. 6 is a circuit diagram of a configuration of an electric discharge machining apparatus according to a third embodiment.
Figure 7:
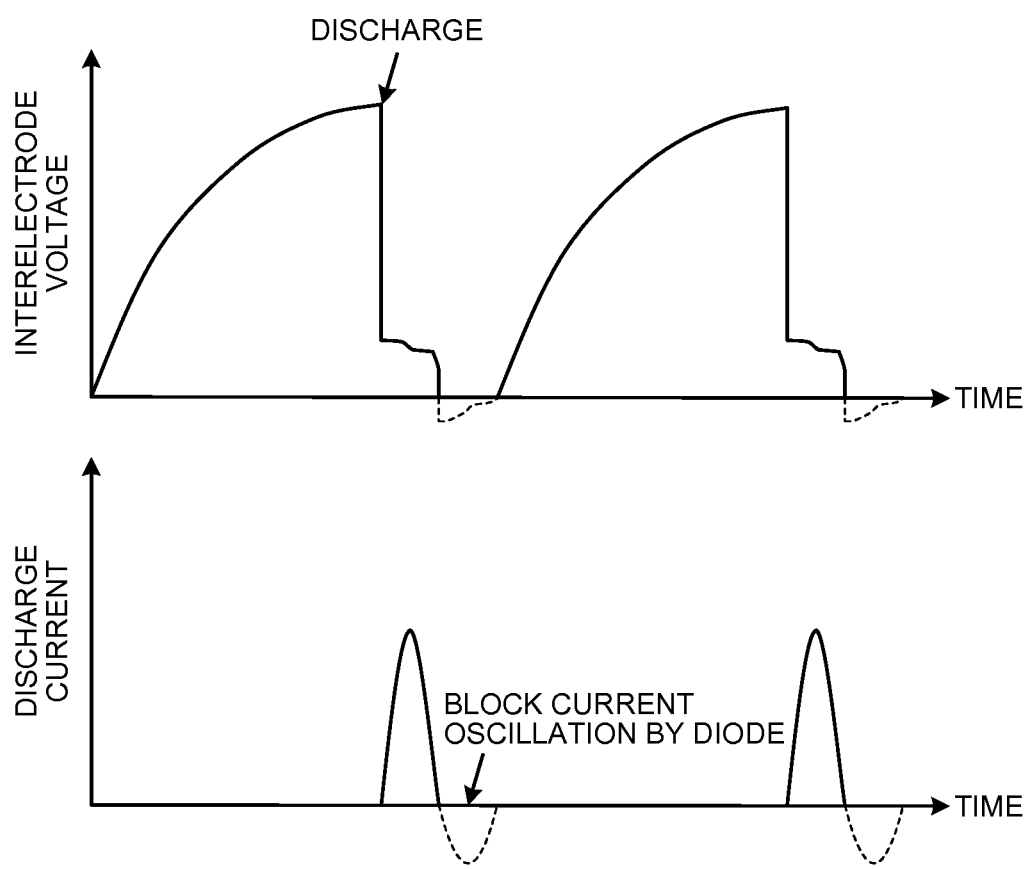
FIG. 7 depicts voltage and current waveforms during discharge in the third embodiment.

Next, an electric discharge machining apparatus 100$j$ according to a third embodiment is explained with reference to FIGS. 6 and 7. FIG. 6 is a circuit diagram of a configuration of the electric discharge machining apparatus 100$j$. FIG. 7 depicts voltage and current waveforms during discharge. The explanation below is mainly of the features that are different from the first embodiment.

In the first embodiment, oscillation of the discharge current is not particularly taken into consideration. However, discharge may become continuous due to current oscillation. This current oscillation depends on the capacitance of the electrode gap 4 (the interelectrode parallel capacitor C1 and the interelectrode parallel floating capacitance Cy1).

Therefore, in the third embodiment, an improvement is made that suppresses the oscillation of the discharge current.

Specifically, the electric discharge machining apparatus 100$j$ includes an earth floating-capacitance current-suppressing circuit 1$bj$ instead of the earth floating-capacitance current-suppressing circuit 1$b$. The earth floating-capacitance current-suppressing circuit 1$bj$ further includes an oscillation suppression diode D1. The oscillation suppression diode D1 is connected in series between the earth floating-capacitance current-suppressing coil La and the electrode gap 4 and is, for example, inserted in series between the interelectrode parallel capacitor C1 and the electrode gap 4. Accordingly, the oscillation of the discharge current can be suppressed, and the discharge current can be reduced.

Examples of waveforms of the discharge voltage and the current when the oscillation suppression diode D1 is inserted are shown in FIG. 7. As shown in FIG. 7, because the oscillation suppression diode D1 is inserted, the current in the forward direction during discharge flows to the electrode gap 4; however, the current in the reverse direction due to the oscillation can be suppressed, and the amount of current can be decreased.

As described above, according to the third embodiment, in the electric discharge machining apparatus 100$j$, the oscillation suppression diode D1 is connected in series between the earth floating-capacitance current-suppressing coil La and the electrode gap 4. Accordingly, oscillation components of the discharge current can be suppressed, and the amount of current can be decreased, thereby enabling the surface roughness to be refined.

INDUSTRIAL APPLICABILITY

As described above, the electric discharge machining apparatus according to the present invention is useful for performing discharge machining.

REFERENCE SIGNS LIST

1$a$ switching circuit, 1$b$, 1$bi$, 1$bj$ earth floating-capacitance current-suppressing circuit, 2 electrode, 3 workpiece, 4 electrode gap, 5$a$, 5$b$ cable, 6$a$, 6$b$ cable, 100, 100$i$, 100$j$ electric discharge machining apparatus, R1 current limiting resistor, R2 current limiting resistor, C1 interelectrode parallel capacitor, Cy1 interelectrode parallel floating capacitance, La earth floating-capacitance current-suppressing coil, SW1 to SW4 switching element (semiconductor switch or mechanical relay), Cy21 to Cy24 earth floating capacitance, L1 time-constant adjusting coil, La$i$ earth floating-capacitance current-suppressing coil (adjustment of number of windings), La$i$' earth floating-capacitance current-suppressing coil (adjustment of winding interval), D1 oscillation suppression diode.

The invention claimed is:
1. An electric discharge machining apparatus comprising:
a power supply;
an electrode gap configured to be formed by an electrode and a workpiece; and
an earth floating-capacitance current-suppressing coil configured to be inserted between the power supply and the electrode gap, wherein the earth floating-capacitance current-suppressing coil includes:
a core;
a first winding configured to be connected between the power supply and the electrode and to be wound around the core; and
a second winding configured to be connected between the power supply and the workpiece and to be wound around the core in an opposite direction to that of the first winding.
2. The electric discharge machining apparatus according to claim 1, further comprising a switching circuit configured to switch over the polarity of a voltage applied from the power supply to the electrode gap.

3. The electric discharge machining apparatus according to claim 1, further comprising a current limiting resistor configured to be connected in series between the power supply and the electrode gap.

4. The electric discharge machining apparatus according to claim 1, further comprising a time-constant adjusting coil configured to be connected in series between the power supply and the electrode gap.

5. The electric discharge machining apparatus according to claim 1, wherein at least one of following elements is arranged near the electrode gap:
- a current limiting resistor configured to be connected in series between the power supply and the electrode gap,
- a time-constant adjusting coil configured to be connected in series between the power supply and the electrode gap, and
- the earth floating-capacitance current-suppressing coil.

6. The electric discharge machining apparatus according to claim 1, wherein the first winding and the second winding have at least one of a different number of windings and a different winding interval.

7. The electric discharge machining apparatus according to claim 1, further comprising a diode configured to be connected in series between the earth floating-capacitance current-suppressing coil and the electrode gap.

8. The electric discharge machining apparatus according to claim 1, further comprising an earth cable connected to the electrode gap and grounded on a path between the earth floating-capacitance current-suppressing coil and the electrode gap.

9. The electric discharge machining apparatus according to claim 1, further comprising an interelectrode parallel capacitor connected in parallel with the electrode gap with respect to the power supply.

* * * * *